United States Patent Office 2,793,240
Patented May 21, 1957

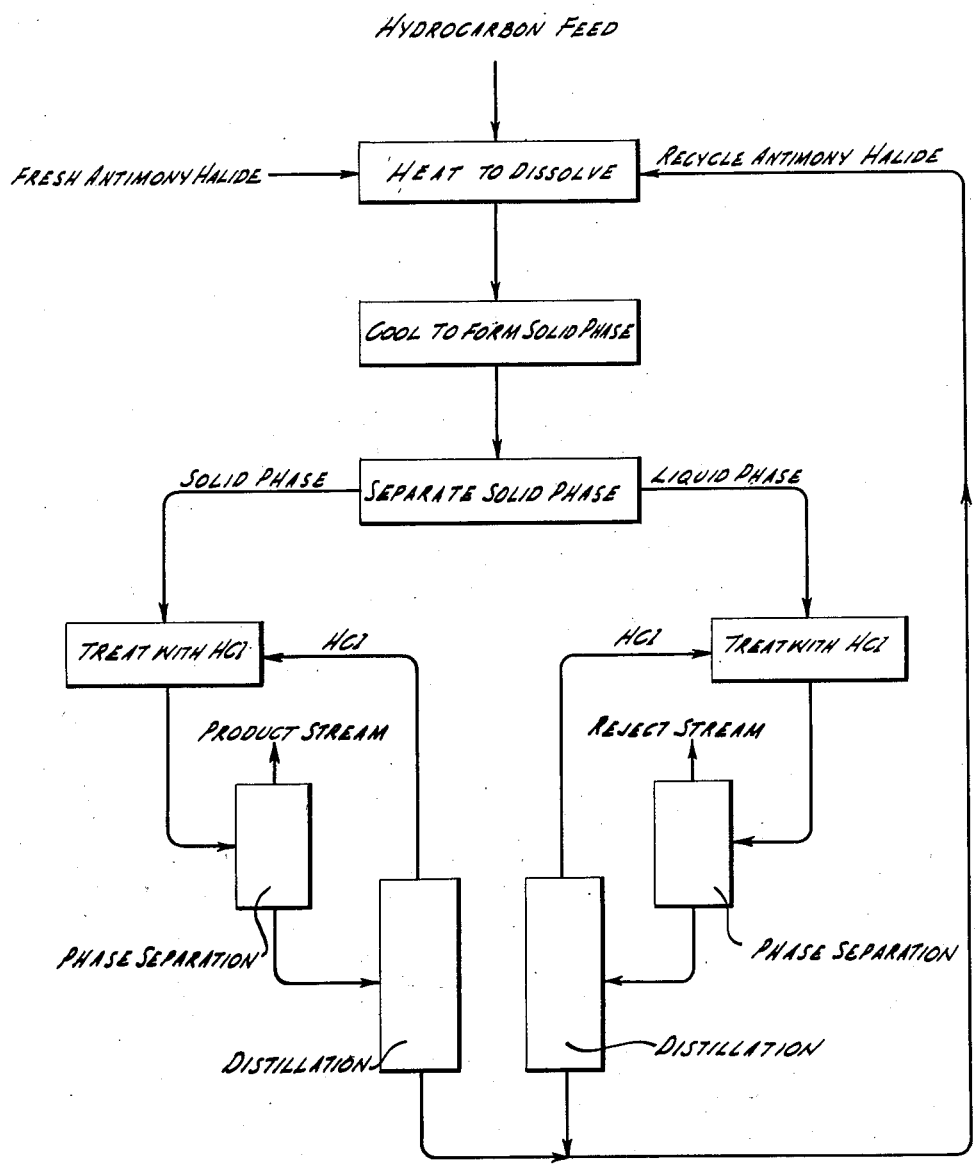

2,793,240

SEPARATION OF AROMATIC HYDROCARBONS

William D. Schaeffer, Ontario, and Carleton B. Scott, Pomona, Calif., assignors to Union Oil Company of California, Los Angeles, Calif., a corporation of California Application November 16, 1953, Serial No. 392,304

15 Claims. (Cl. 260—674)

This invention relates to the separation of aromatic hydrocarbons, and in particular concerns an improved process for separating one or more specific isomers from mixtures of isomeric dialkylbenzenes in which the alkyl groups contain from one to four carbon atoms.

At the present time many aromatic hydrocarbons, particularly the lower dialkylbenzenes, are produced by methods which yield mixtures of compounds which cannot be separated by conventional fractional distillation procedures. For example, the $C_8$ fraction of the product obtained in petroleum hydrocarbon reforming operations comprises ortho-, meta- and para-xylenes, all of which have boiling points within about 8° C. of each other. Two of the isomers, meta- and para-xylene, boil within about 0.5° C. of each other. Various methods have been proposed for resolving mixtures of this type into their individual components, e. g., fractional crystallization and selective chemical reaction, but all of these methods present serious disadvantages in large-scale commercial operation.

It is accordingly an object of the present invention to provide an improved method for separating lower dialkylbenzenes whose boiling points lie within a narrow range.

Another object is to provide a commercially attractive method for separating isomeric xylenes.

A further object is to provide an improved method for separating individual isomers from the $C_8$ fraction of petroleum hydrocarbon reformates.

Other and related objects will be apparent from the following detailed description of the invention, and various advantages not specifically referred to herein will occur to those skilled in the art upon employment of the invention in practice.

We have now found that the above objects and attendant advantages may be realized in a process which comprises (1) forming addition compounds or complexes between the components of the hydrocarbon mixture and an antimony halide, (2) separating such addition compounds or complexes by fractional crystallization, (3) treating the addition compounds or complexes so separated with an aqueous hydrogen halide to decompose the same and form a hydrocarbon phase and an aqueous phase containing the hydrogen halide and antimony halide, and (4) distilling the aqueous phase to recover an overhead fraction of aqueous hydrogen halide suitable for use in step (3) and a bottoms fraction comprising the antimony halide suitable for use in step (1). More particularly, we have found that individual isomers or specific mixtures of isomers may be separated from isomeric mixtures of lower dialkylbenzenes by admixing the isomeric mixture with an antimony halide at a temperature such that a single liquid phase is formed, and thereafter cooling the liquid to effect precipitation of a crystalline solid phase comprising the antimony halide and the isomeric hydrocarbons in a ratio substantially different from that of the original hydrocarbon mixture. The solid phase is separated from the liquid and is thereafter treated with an aqueous hydrogen halide. Such treatment decomposes the solid phase into its hydrocarbon and antimony halide components, and results in the formation of an upper hydrocarbon phase containing components of the original hydrocarbon mixture and a lower aqueous phase containing the hydrogen halide and the antimony halide. The two phases are separated and the aqueous phase is distilled to separate the aqueous hydrogen halide from the antimony halide. The aqueous hydrogen halide and antimony halide so obtained are suitable for recycling back to the previous points in the system where these materials are employed. The mother liquor from which the solid phase was separated may likewise be treated with an aqueous hydrogen halide to recover the hydrocarbon components therefrom, and the aqueous phase from such treatment may be distilled in the same manner to recover the components thereof for re-use in the process.

Such process is capable of securing a high degree of resolution of hydrocarbon mixtures of the present class, and is well adapted to continuous operation on a commercial scale. It is particularly advantageous in that it requires no consumption of chemicals, other than incidental losses, and may be carried out in conventional equipment with only very little consumption of heat or refrigeration.

For convenience, the process is for the most part described herein as it is applied to the treatment of mixtures comprising isomeric xylenes, but it is to be understood that it is broadly applicable to the treatment of mixed dialkylbenzenes in which each alkyl group contains from 1 to 4 carbon atoms, e. g., mixtures of diethylbenzenes, ethyl-isopropylbenzenes, di-isobutylbenzenes, cymenes, butyltoluenes, di-isopropylbenzenes, etc.

Referring now to the single figure of the accompanying drawing which forms a part of this application and which is a schematic flow diagram illustrating one embodiment of the invention, the initial step of the process consists simply in admixing the dialkylbenzene mixture with an antimony halide and heating to effect the formation of a single liquid phase. Either antimony trichloride or antimony tribromide, or mixtures of the two, may be employed, and technical as well as reagent grades are suitable. According to the preferred embodiment of the invention illustrated by the drawing, substantially all of the antimony halide is employed in the form of a recycle stream supplied from a subsequent point or points in the system, with only enough fresh antimony halide being supplied to make up for incidental handling losses.

The amount in which the antimony halide is employed depends somewhat upon the composition of the hydrocarbon mixture being treated, i. e., upon the proportion of the component which the antimony halide selectively separates from the mixture. When the mixture comprises a para-dialkylbenzene, the para isomer is the component which is separated from the other components, and the amount of antimony halide employed will depend somewhat upon the proportion of the para isomer in the mixture. In general, between about 0.5 and about 10 moles of the antimony halide is employed per mole of the hydrocarbon which is preferentially separated. When the hydrocarbon mixture contains between about 15 and about 75 percent by weight of the para isomer, the antimony halide is preferably employed in an amount representing between about 0.5 and about 5 moles per mole of the mixture.

The temperature to which the mixture of hydrocarbons and antimony halide must be heated to effect the formation of a single phase is usually between about 40° C. and about 90° C., depending upon the composition and identity of the hydrocarbon mixture and the amount and identity of the antimony halide employed. Inasmuch as the mixture must subsequently be cooled, greatest heat economy will be realized by dissolving the antimony halide in the hydrocarbon at the lowest temperature possible. The hydrocarbon mixture or the antimony halide, or both, may be heated to the required temperature prior to admixing the two, or they may be admixed at room temperature and thereafter heated until a single liquid phase is formed. If desired, solution of the antimony halide in the hydrocarbon mixture may be promoted with the aid of an inert diluent.

The second step of the process consists in cooling the liquid mixture to effect the precipitation of a crystalline solid phase. The temperature to which the liquid phase must be cooled depends upon a number of factors. As in substantially all crystallization operations, the material which initially crystallizes out of solution is the purest, and the maximum quantity of crystallized material is obtained only at a sacrifice of purity. Accordingly, if it is desired to operate the present process to obtain one of the components of the hydrocarbon mixture in a high state of purity, but in decreased yield, the liquid mixture of hydrocarbons and antimony halide will be cooled only sufficiently to produce a relatively small quantity of crystals. On the other hand, if it is desired to effect a greater recovery at a sacrifice in purity, the mixture may be cooled to a much lower temperature before separating off the solid phase. The temperature at which the solid phase precipitates also depends upon the identity and composition of the hydrocarbon mixture being treated, and the identity and amount of the antimony halide employed. Thus, precipitation occurs at higher temperatures when the hydrocarbon contains a relatively high proportion of the component whose separation is effected. In general, however, the temperature to which the liquid mixture of hydrocarbons and antimony halide is cooled will be between about 0° C. and about 70° C., depending upon the foregoing factors. When the hydrocarbon mixture comprises the three isomeric xylenes, such temperature is usually between about 10° C. and about 40° C.

Separation of the crystalline solid phase from the cooled liquid may be carried out in any of the conventional ways, e. g., by filtration, centrifuging, or in some cases by settling and decantation. The crystals are of relatively large size and settle rapidly, and no difficulty is encountered in separating them from the liquid by simple filtration.

Decomposition of the solid addition compound or complex to recover the hydrocarbon components thereof is accomplished in accordance with the invention by treatment with an aqueous hydrogen halide. Such treatment is conveniently carried out simply by transferring the separated solid to a suitable acid-resistant vessel containing sufficient hydrochloric or hydrobromic acid to effect solution of the solid, and stirring the mixture at room temperature until the solid is completely dissolved. Such amount of acid usually corresponds to between about 0.5 and about 2 moles of acid per mole of solid. If desired, the mixture may be heated to 25°–90° C. to promote more rapid solution of the solid. Either hydrochloric or hydrobromic acid, preferably the former, may be employed as the aqueous hydrogen halide, and it is desirable that the halogen atom be the same as that of the antimony halide. As is hereinafter more fully explained and as shown in the drawing, the aqueous hydrogen halide is preferably that supplied as a recycle stream obtained from a subsequent distillation step, with only sufficient fresh hydrogen halide being added to make up for handling losses, and accordingly it will have a concentration equivalent to that of the constant-boiling mixture of the hydrogen halide and water. In the case of hydrogen chloride such concentration is about 20 percent by weight. If desired, however, aqueous hydrogen halides of higher or lower concentration may be employed.

The product obtained from the aqueous hydrogen halide treatment consists of two liquid phases, the upper of which comprises the hydrocarbons which were associated with the antimony halide in the crystalline solid. The lower phase comprises the aqueous hydrogen halide and the antimony halide. These two phases are separated, and the upper phase is passed to storage as the product stream comprising the hydrocarbons present in the original isomeric hydrocarbon mixture, but enriched in one of the components of the original hydrocarbon mixture. The lower phase is distilled to recover a distillate comprising constant-boiling aqueous hydrogen halide which is suitable for return as a recycle stream for the treatment of a further quantity of the crystalline solid addition compound or complex. The bottoms fraction consists of antimony halide, which may be returned as a recycle stream to the initial step of the process for treating a further quantity of the feed mixture.

According to the preferred method of operation illustrated in the drawing, the mother liquor from which the crystalline solid has been separated is likewise subjected to treatment with an aqueous hydrogen halide, followed by phase separation and distillation of the lower phase to recover the antimony halide and aqueous hydrogen halide as recycle streams for re-use in the process. The upper phase constitutes the reject stream of the process and comprises the hydrocarbons of the original hydrocarbon mixture lean in at least one of the components thereof.

As will be apparent to those skilled in the art, the process of the invention may be carried out batch-wise or continuously with periodic or continuous recycling of the antimony halide and aqueous hydrogen halide. Also, like other separation processes it may be carried out in a plurality of stages arranged in cascade fashion. For example, a mixture of xylene isomers may be subjected to treatment in an initial separation stage in accordance with the process of the invention to obtain an initial product stream enriched in paraxylene and an initial reject stream which is lean in para-xylene. The initial product stream may then be passed to a secondary separation stage and re-treated with an antimony halide and aqueous hydrogen halide as herein explained to obtain a secondary product stream which is more highly enriched in the para isomer and a secondary reject stream. The latter may be recycled back to the initial separation stage, and the secondary product stream may be passed to a tertiary separation stage and again treated with an antimony halide and an aqueous hydrogen halide. By providing an appropriate number of stages and feeding the product stream to the next succeeding stage while returning the reject stream to the next preceding stage, substantially all of the para-xylene may be recovered in pure form from the feed mixture.

The following examples will illustrate several ways in which the principle of the invention has been applied, but are not to be construed as limiting the same:

*Example I*

One-half mole of a hydrocarbon mixture comprising:

| | Percent by vol. |
|---|---|
| p-Xylene | 34.2 |
| m-Xylene | 41.7 |
| o-Xylene | 12.0 |
| Ethylbenzene | 12.1 |
| | 100.0 | is admixed with 1 mole of antimony trichloride and 24.5 ml. of n-heptane. The mixture is warmed to about 65° C., whereupon the antimony trichloride completely dissolves to form a single liquid phase. The mixture is then cooled to about 20° C., and the white crystalline solid which is thereby precipitated is filtered off and washed with n-heptane. The crystalline solid is dissolved in about 2 moles of aqueous hydrogen chloride and the solution is allowed to stand to permit phase separation. The upper phase is drawn off, dried over anhydrous sodium sulfate, and analyzed. The filtrate from which the solid was separated is likewise treated with aqueous hydrogen chloride, followed by separation of the phases and analysis of the upper phase. The analyses, on a heptane-free basis, are as follows:

|  | Upper Phase from Crystals | Upper Phase from Filtrate |
|---|---|---|
| p-Xylene, Percent by Vol | 85.3 | 14.7 |
| m-Xylene, Percent by Vol | 13.4 | 48.3 |
| o-Xylene, Percent by Vol | 1.3 | 19.1 |
| Ethylbenzene, Percent by Vol | 0.0 | 17.9 |

The ratio of the para and meta isomers is about 0.82/1 in the feed mixture, about 6.4/1 in the hydrocarbon phase recovered from the crystalline solid, and about 0.30/1 in the hydrocarbon phase recovered from the filtrate.

Example II

About 54 parts by weight of a C8 reformate comprising:

| | Percent by vol. |
|---|---|
| p-Xylene | 26.5 |
| m-Xylene | 45.9 |
| o-Xylene | 15.3 |
| Ethylbenzene | 12.3 |
| | 100.0 | is admixed with about 157 parts by weight of antimony trichloride and heated to about 75° C. to effect complete solution, and the solution is then cooled to about 23° C. The crystalline solid which is thereby precipitated is filtered off, and treated with aqueous hydrogen chloride as in Example I. The upper phase of the product so obtained amounts to about 20 parts by weight and analyzes 57.3 percent by volume of p-xylene. Upon repeating the procedure, but with cooling to about 12° C. before filtering off the solid phase, the product is obtained in an amount of about 40 parts by weight analyzing 35.7 percent by volume of p-xylene.

Example III

A feed mixture comprising equal parts by volume of para- and meta-xylenes is admixed with two moles of antimony tribromide, and the mixture is heated to about 60° C. to attain the formation of a single liquid phase. The solution is then cooled to about 25° C., and the crystalline solid which is thereby precipitated is filtered off and dissolved in about 2 moles of concentrated hydrochloric acid. The resulting product is allowed to stand to permit stratification, and the phases are then separated. The upper hydrocarbon phase contains about 89 percent by volume of para-xylene and about 11 percent by volume of meta-xylene. The hydrocarbon phase obtained by treating the filtrate with hydrochloric acid analyzes about 28 percent by volume of para-xylene and about 72 percent by volume of meta-xylene.

Example IV

A mixture of isomeric ethyltoluenes comprising:

| | Percent by vol. |
|---|---|
| p-Ethyltoluene | 28.6 |
| m-Ethyltoluene | 39.7 |
| o-Ethyltoluene | 31.7 | is treated with antimony trichloride and aqueous hydrogen chloride as in Example I. The hydrocarbon recovered from the crystalline solid contains about 58 percent by volume of para-ethyltoluene, and the hydrocarbon recovered from the filtrate contains about 22 percent of para-ethyltoluene.

Example V

A C8 product obtained by fractionally distilling a glycol-extracted petroleum hydrocarbon reformate, having the following approximate composition:

| | Percent by vol. |
|---|---|
| p-Xylene | 20 |
| m-Xylene | 45 |
| o-Xylene | 20 |
| Ethylbenzene | 15 |
| | 100.0 | is passed into a vessel equipped with internally-mounted coils and a stirrer, and is therein admixed with approximately 2 molecular equivalents of recycled antimony trichloride. The mixture is heated with stirring to a temperature of about 72° C. by passing steam through the coils. Upon the formation of a single liquid phase, the steam supply is disconnected and water is passed through the coils to lower the temperature of the solution to about 20° C. over a period of about 5 hours, during which time a white crystalline solid precipitates. The mixture of liquid and solid is passed to a vacuum filter, and the sepaarted solid is washed on the filter with gasoline. The solid is then transfered to a glass-lined vessel equipped with a stirrer and is therein dissolved in about 2 molecular equivalents of hydrogen chloride in the form of a constant-boiling aqueous solution. The filtrate and gasoline washings are likewise treated with aqueous hydrogen chloride. In each case the hydrogen chloride-treated product is allowed to stand quiescent to permit stratification, and the upper and lower phases are drawn off as product and reject streams, respectively. The product stream analyzes about 77 percent by volume of p-xylene. The reject stream is distilled to recover the gasoline for re-use and, on a gasoline-free basis, contains about 16 percent by volume of p-xylene. The lower phases of the two hydrogen chloride-treated products are combined and passed to a distillation column and fractionally distilled under atmospheric pressure. The overhead fraction, distilling at about 110° C. and consisting of constant-boiling aqueous hydrogen chloride, is condensed and returned to the process for use in treating further quantities of the crystalline solid and the liquid from which it is separated, and the bottoms fraction consisting of antimony trichloride is returned to the initial admixing step.

Other modes of applying the principle of our invention may be employed instead of those explained, change being made as regards the methods or materials employed, provided the step or steps stated by any of the following claims, or the equivalent of such stated step or steps be employed.

We, therefore, particularly point out and distinctly claim as our invention:

1. The method of treating a hydrocarbon mixture comprising a para-dialkylbenzene and at least one other dialkylbenzene isomeric therewith, each of the alkyl groups of said isomeric dialkylbenzenes containing from 1 to 4 carbon atoms, which comprises (1) dissolving in said mixture an antimony halide selected from the class consisting of antimony trichloride and antimony tribromide; (2) lowering the temperature of the resulting solution to a value at which there forms therein a solid phase comprising said antimony halide and isomeric dialkylbenzenes, the ratio of said para-dialkylbenzene to other dialkylbenzenes in said solid phase being substantially higher than the ratio thereof in the original mixture; (3) separating said solid phase from the liquid; (4) dissolving the solid phase in an aqueous solution of a hydrogen halide selected from the class consisting of hydrogen chloride and hydrogen bromide; and (5) separating the hydrocarbon and aqueous components of the resulting product.

2. The method of claim 1 wherein the original isomeric mixture comprises isomeric xylenes.

3. The method of claim 1 wherein the original mixture is the C₈ fraction of a petroleum hydrocarbon reformate comprising isomeric xylenes and ethylbenzene.

4. The method of claim 1 wherein the antimony halide is antimony trichloride and the hydrogen halide is hydrogen chloride.

5. The method of treating a hydrocarbon mixture comprising a para-dialkylbenzene and at least one other dialkylbenzene isomeric therewith, each of the alkyl groups of said isomeric dialkylbenzenes containing from 1 to 4 carbon atoms, which comprises (1) admixing said mixture with antimony trichloride at a temperature sufficient to effect the formation of a single liquid phase; (2) lowering the temperature of said liquid phase to a value such that there forms therein a solid phase comprising antimony trichloride and isomeric dialkylbenzenes, the ratio of said para-dialkylbenzene to other dialkylbenzenes in said solid phase being substantially higher than the ratio thereof in the original mixture; (3) separating the solid phase from the mother liquor; (4) dissolving the separated solid phase in aqueous hydrogen chloride; (5) separating the upper hydrocarbon phase from the two-phase liquid which is thereby obtained; and (6) distilling the lower aqueous phase to obtain on overhead fraction comprising aqueous hydrogen chloride and a bottoms fraction comprising antimony trichloride.

6. The method of claim 5 wherein the mixture of isomeric dialkylbenzenes comprises mixed xylene isomers.

7. The method of claim 5 wherein the mixture of isomeric dialkylbenzenes comprises ortho-, meta-, and para-xylene and ethylbenzene.

8. The method of treating a hydrocarbon mixture comprising a para-dialkylbenzene and at least one other dialkylbenzene isomeric therewith, each of the alkyl groups of said isomeric dialkylbenzenes containing from 1 to 4 carbon atoms, which comprises (1) admixing said mixture with antimony trichloride at a temperature sufficient to effect the formation of a single liquid phase; (2) lowering the temperature of said liquid phase to a value such that there forms therein a solid phase comprising antimony trichloride and isomeric dialkylbenzenes, the ratio of said para-dialkylbenzene to other dialkylbenzenes in said solid phase being substantially higher than the ratio thereof in the original mixture; (3) separating the solid phase from the mother liquor; (4) treating said mother liquor with aqueous hydrogen chloride; (5) separating the upper hydrocarbon phase from the two-phase liquid which is thereby obtained; and (6) distilling the lower aqueous phase of said two-phase liquid to obtain an overhead fraction comprising aqueous hydrogen chloride and a bottoms fraction comprising antimony trichloride.

9. The method of treating a hydrocarbon mixture comprising a para-dialkylbenzene and at least one other dialkylbenzene isomeric therewith, each of the alkyl group of said dialkylbenzenes containing from 1 to 4 carbon atoms, which comprises (1) admixing said mixture with antimony trichloride at a temperature sufficient to effect the formation of a single liquid phase; (2) lowering the temperature of said liquid phase to a value such that there forms therein a solid phase comprising antimony trichloride and isomeric dialkylbenzenes, the ratio of said para-dialkylbenzene to other dialkylbenzenes in said solid phase being substantially higher than the ratio thereof in the original mixture; (3) separating the solid phase from the mother liquor; (4) dissolving the separated solid phase in aqueous hydrogen chloride; (5) separating the upper hydrocarbon phase from the two-phase liquid which is thereby obtained; (6) distilling the lower aqueous phase of said two-phase liquid to obtain an overhead fraction comprising aqueous hydrogen chloride and a bottoms fraction comprising antimony trichloride; (7) treating said mother liquor with aqueous hydrogen chloride; (8) separating the upper hydrocarbon phase from the two-phase liquid which is thereby obtained; and (9) distilling the lower aqueous phase to obtain an overhead fraction comprising aqueous hydrogen chloride and a bottoms fraction comprising antimony trichloride.

10. The method of claim 9 wherein the bottoms fraction obtained in steps (6) and (9) are returned to step (1), and the overhead fractions obtained in steps (6) and (9) are returned to steps (4) and (7).

11. The method of treating a mixture comprising xylene isomers, including para-xylene, which comprises (1) admixing said mixture with antimony trichloride at a temperature sufficient to effect the formation of a single liquid phase; (2) lowering the temperature of said liquid phase to a value such that there forms therein a solid phase comprising antimony trichloride and xylene isomers, the ratio of para-xylene to other xylene isomers in said solid being substantially higher than the ratio thereof in the original mixture; (3) separating said solid from said mother liquor; (4) dissolving the separated solid in constant-boiling aqueous hydrogen chloride; (5) separating the upper hydrocarbon phase from the two-phase liquid which is thereby formed; (6) distilling the lower aqueous phase to obtain an overhead fraction comprising constant-boiling aqueous hydrogen chloride and a bottoms fraction comprising antimony trichloride; (7) returning said overhead fraction to step (4); and (8) returning said bottoms fraction to step (1).

12. The method of claim 11 wherein the antimony trichloride is employed in an amount representing between about 0.5 and about 5 moles per mole of the original isomeric mixture.

13. The process of claim 11 wherein the temperature to which the liquid phase is cooled to effect separation of the solid phase is between about 10° C. and about 40° C.

14. The method of treating a mixture comprising ortho-, meta- and para-xylenes and ethylbenzene which comprises (1) admixing said mixture with between about 0.5 and about 5 moles of antimony trichloride per mole of said mixture; (2) heating the resulting mixture to a temperature between about 40° C. and about 90° C. to effect the formation of a single liquid phase; (3) cooling said liquid to a temperature between about 10° C. and about 40° C. to effect the precipitation of a solid phase comprising antimony trichloride and hydrocarbon components of the original mixture, the ratio of para-xylene to the other hydrocarbon components of said solid phase being substantially higher than the ratio thereof in the original mixture; (4) separating said solid phase from the mother liquor; (5) dissolving the separated solid phase in constant-boiling aqueous hydrogen chloride; (6) separating the upper hydrocarbon phase from the two-phase liquid which is thereby formed; (7) treating said mother liquor with constant-boiling aqueous hydrogen chloride; (8) separating the upper phase from the two-phase liquid which is thereby obtained; (9) distilling the lower aqueous phases obtained in steps (6) and (8) to separate constant-boiling aqueous hydrogen chloride from the antimony trichloride contained therein; (10) returning said separated constant-boiling aqueous hydrogen chloride to steps (5) and (7); and (11) returning said separated antimony trichloride to step (1).

15. The process of claim 14 wherein the original mixture is the C₈ fraction of a petroleum hydrocarbon reformate.

References Cited in the file of this patent

UNITED STATES PATENTS 2,605,211 Deters _____ July 29, 1952
2,652,436 Hess et al. _____ Sept. 15, 1953

OTHER REFERENCES

International Critical Tables, vol. IV, first ed. (1928), pages 192–193 and 196. Pub. by McGraw-Hill Book Co., New York, New York.